United States Patent
Nagatsuka et al.

(10) Patent No.: US 10,640,109 B2
(45) Date of Patent: May 5, 2020

(54) TRAVEL CONTROL DEVICE FOR VEHICLE

(71) Applicant: Hitachi Automotive Systems, Ltd., Hitachinaka-shi, Ibaraki (JP)

(72) Inventors: Keiichiro Nagatsuka, Hitachinaka (JP); Toshiyuki Innami, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 66 days.

(21) Appl. No.: 15/558,628

(22) PCT Filed: Mar. 16, 2016

(86) PCT No.: PCT/JP2016/058224
§ 371 (c)(1),
(2) Date: Sep. 15, 2017

(87) PCT Pub. No.: WO2016/163210
PCT Pub. Date: Oct. 13, 2016

(65) Prior Publication Data
US 2018/0086340 A1 Mar. 29, 2018

(30) Foreign Application Priority Data

Apr. 10, 2015 (JP) .................................. 2015-081209

(51) Int. Cl.
*B60W 30/12* (2020.01)
*B60W 10/18* (2012.01)
(Continued)

(52) U.S. Cl.
CPC ............ *B60W 30/12* (2013.01); *B60W 10/04* (2013.01); *B60W 10/18* (2013.01); *B60W 10/20* (2013.01);
(Continued)

(58) Field of Classification Search
CPC combination set(s) only.
See application file for complete search history.

(56) References Cited

U.S. PATENT DOCUMENTS

| 2012/0179349 A1 | 7/2012 | Yamakado et al. |
| 2014/0145498 A1 | 5/2014 | Yamakado et al. |
| 2015/0367852 A1 | 12/2015 | Nagatsuka et al. |

FOREIGN PATENT DOCUMENTS

| CN | 102481930 A | 5/2012 |
| EP | 2 484 572 A1 | 8/2012 |

(Continued)

OTHER PUBLICATIONS

International Search Report (PCT/ISA/210) issued in PCT Application No. PCT/JP2016/058224 dated Jul. 5, 2016 with English translation (Five (5) pages).

(Continued)

*Primary Examiner* — Adam D Tissot
*Assistant Examiner* — Edward J Pipala
(74) *Attorney, Agent, or Firm* — Crowell & Moring LLP

(57) ABSTRACT

Provided is a travel control device for a vehicle such that comfortable and safe control for the vehicle is possible without disturbing the driver. The travel control device for the vehicle is provided with a control command computation unit for calculating a steering assist amount for assisting the steering of the vehicle and an acceleration command value for controlling braking and driving forces of the vehicle. The control command computation unit calculates an estimated lateral position of the vehicle at a gaze distance ahead of the vehicle; calculates a lateral displacement amount of the vehicle at the estimated lateral position from a target traveling path and a lateral displacement speed; calculates a steering assist amount on the basis of the lateral displacement amount and the lateral displacement speed; calculates a lateral acceleration and lateral jerk generated by the (Continued)

vehicle according to the steering assist amount; and calculates an acceleration command value based on the lateral acceleration and the lateral jerk.

10 Claims, 6 Drawing Sheets

(51) Int. Cl.
    *B60W 10/20*     (2006.01)
    *B60W 30/045*     (2012.01)
    *B60W 30/095*     (2012.01)
    *B62D 15/02*     (2006.01)
    *B60W 10/04*     (2006.01)
    *B62D 5/04*     (2006.01)
    *B60W 50/00*     (2006.01)
    *B60W 30/18*     (2012.01)
    *B60W 30/02*     (2012.01)
    *B60W 50/14*     (2020.01)
    *B60K 35/00*     (2006.01)

(52) U.S. Cl.
    CPC ...... *B60W 30/045* (2013.01); *B60W 30/0953* (2013.01); *B62D 5/0463* (2013.01); *B62D 15/025* (2013.01); *B60K 35/00* (2013.01); *B60W 30/025* (2013.01); *B60W 30/18145* (2013.01); *B60W 2050/005* (2013.01); *B60W 2050/0056* (2013.01); *B60W 2050/0057* (2013.01); *B60W 2050/146* (2013.01); *B60W 2510/202* (2013.01); *B60W 2520/125* (2013.01); *B60W 2710/18* (2013.01); *B60W 2710/20* (2013.01); *B60W 2710/202* (2013.01); *B60W 2720/106* (2013.01); *B62D 15/0255* (2013.01)

(56) References Cited

FOREIGN PATENT DOCUMENTS

| | | |
|---|---|---|
| JP | 11-102499 A | 4/1999 |
| JP | 2003-63437 A | 3/2003 |
| JP | 2006-282168 A | 10/2006 |
| JP | 2010-23605 A | 2/2010 |
| JP | 2010-36757 A | 2/2010 |
| JP | 2013-67382 A | 4/2013 |
| JP | 2014-24448 A | 2/2014 |
| WO | WO 2012/043683 A1 | 4/2012 |
| WO | WO 2014/119171 A1 | 8/2014 |

OTHER PUBLICATIONS

Japanese-language Written Opinion (PCT/ISA/237) issued in PCT Application No. PCT/JP2016/058224 dated Jul. 5, 2016 (Five (5) pages).
Extended European Search Report issued in counterpart European Application No. 16776379.6 dated Oct. 8, 2018 (eight (8) pages).
Chinese-language Office Action issued in counterpart Chinese Application No. 201680019335.5 dated Feb. 26, 2019 with English translation (22 pages).

TRAVEL CONTROL DEVICE FOR VEHICLE

TECHNICAL FIELD

The present invention relates to a travel control device for a vehicle.

BACKGROUND ART

Conventionally, a lane deviation prevention device is known. The lane deviation prevention device prevents deviation of an own vehicle when the vehicle almost deviates from a driving lane during driving (for example, see PTL 1). PTL 1 discloses a lane deviation prevention device including deviation determination means that determines that an own vehicle almost deviates from a driving lane, and braking and driving force control means that generates the yaw moment in a direction of avoiding the deviation according to a difference in braking force between right and left wheels when the vehicle is determined to almost deviate from the driving lane by the deviation determination means.

CITATION LIST

Patent Literature

PTL 1: JP 2006-282168 A

SUMMARY OF INVENTION

Technical Problem

The lane deviation prevention device disclosed in PTL 1 generates the yaw moment in the direction of avoiding the deviation according to the difference in braking force between right and left wheels by the braking and driving force control means. However, such control provides a driver of the vehicle with a feeling sort of rotation at the site, which is more likely to lead to an uncomfortable feeling for the driver.

The present invention has been made in view of the foregoing, and an objective is to provide a travel control device for a vehicle capable of comfortably and safely controlling the vehicle without providing the driver with an uncomfortable feeling.

Solution to Problem

To achieve the above objective, a travel control device for a vehicle of the present invention is a travel control device for a vehicle including a control command computation unit configured to calculate a steering assist amount for assisting steering of the vehicle and an acceleration command value for controlling braking and driving forces of the vehicle, and the control command computation unit calculates an estimated lateral position of the vehicle at a front gaze distance of the vehicle, calculates a lateral displacement amount from a target traveling path and a lateral displacement speed, of the vehicle at the estimated lateral position, calculates the steering assist amount on the basis of the lateral displacement amount and the lateral displacement speed, calculates lateral acceleration and lateral jerk generated in the vehicle according to the steering assist amount, and calculates the acceleration command value according to the lateral acceleration and the lateral jerk.

Advantageous Effects of Invention

According to the travel control device for a vehicle of the present invention, a travel control device for a vehicle that can comfortably and safely control the vehicle without providing the driver with an uncomfortable feeling can be provided.

DESCRIPTION OF EMBODIMENTS

Hereinafter, embodiments of a travel control device for a vehicle of the present invention will be described with reference to the drawings.

[First Embodiment]

Figure 1:
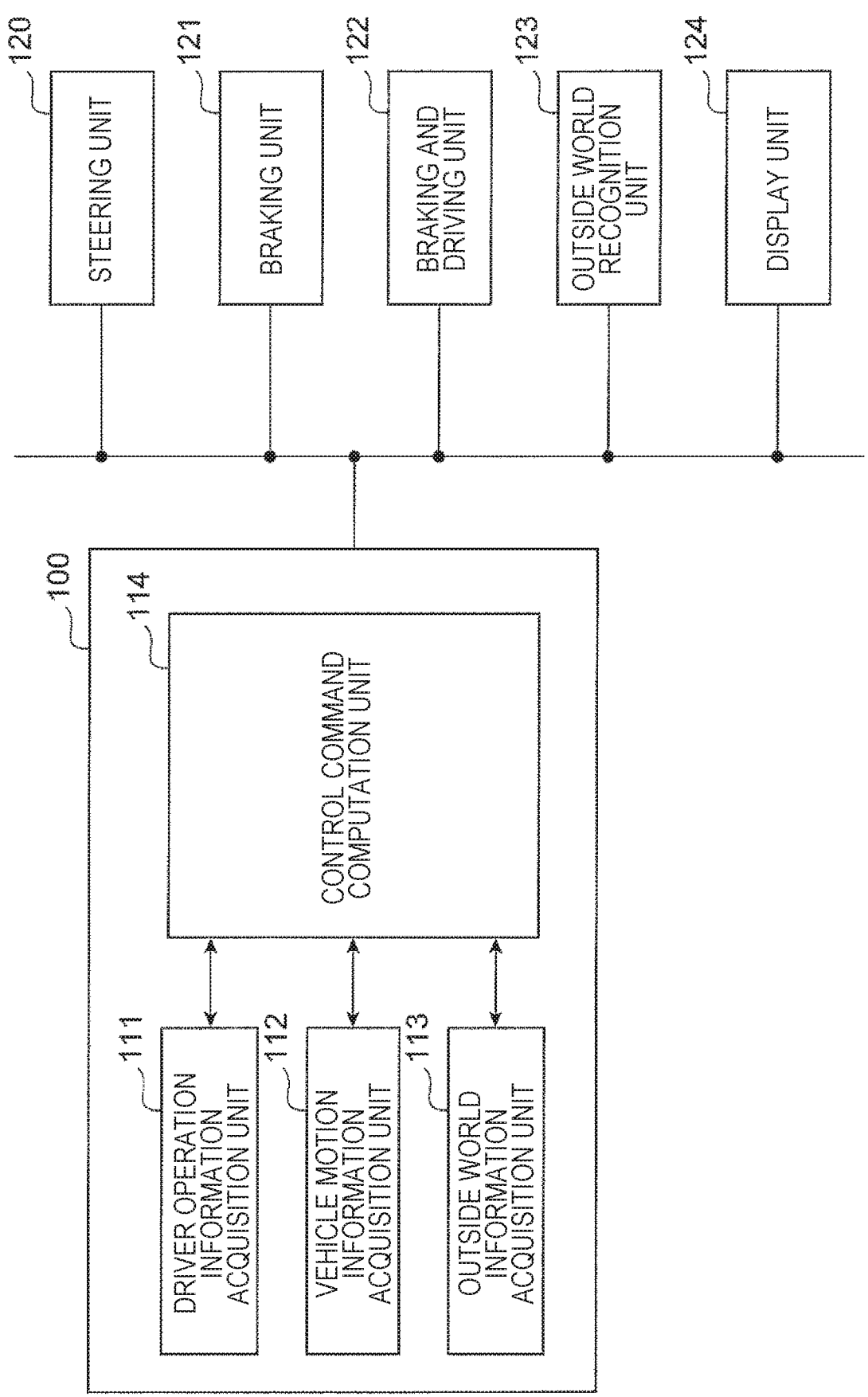
FIG. 1 is a block diagram of a travel control device for a vehicle according to a first embodiment of the invention.

FIG. 1 is a block diagram of a travel control device 100 for a vehicle according to a first embodiment of the present invention. The travel control device 100 includes a driver operation information acquisition unit 111, a vehicle motion information acquisition unit 112, an outside world information acquisition unit 113, and a control command computation unit 114. These units are configured from electronic components such as a CPU, a ROM, a RAM, and input/output ports.

The driver operation information acquisition unit 111 collects driver operation information such as an accelerator operation amount, a brake operation amount, a shift operation, a steer angle, and the like, and transmits the operation information to the control command computation unit 114. The vehicle motion information acquisition unit 112 collects behavior information of a vehicle such as an own vehicle speed, a yaw rate, longitudinal acceleration, and lateral acceleration, and transmits the behavior information to the control command computation unit 114. The outside world information acquisition unit 113 collects data acquired in an outside world recognition unit 123, and transmits the data to the control command computation unit 114.

As the information transmitted from the driver operation information acquisition unit 111, the vehicle motion information acquisition unit 112, and the outside world information acquisition unit 113 to the control command computation unit 114, information necessary in a travel control algorithm mounted in the control command computation unit may just be collected. A configuration of a sensor and the like can be added according to necessity of information to be collected.

The control command computation unit 114 stores the travel control algorithm and parameters determined through an experiment in advance, and the like to the ROM, executes various types of computation processing by the CPU, and stores a computation result to the RAM. Note that the configuration of the travel control algorithm mounted in the control command computation unit 114 will be described below.

Transmission of information between the control command computation unit 114, and the driver operation information acquisition unit 111 and the vehicle motion information acquisition unit 112 can be performed by changing serial communication and physical amounts into voltage signals, and reading the voltage signals by an A/D converter (ADC) or the like. However, the necessary information may be received through a controller area network (CAN), which is typically used as an in-vehicle network.

The vehicle in which the travel control device 100 is mounted includes, for example, a steering unit 120, a braking unit 121, a braking and driving unit 122, an outside world recognition unit 123, and a display unit 124.

In the present embodiment, the steering unit 120, the braking unit 121, and the braking and driving unit 122 are respectively configured from so-called by-wire-systems having no mechanical coupling with driver's operation units such as a steering wheel, a brake pedal, and an accelerator pedal. That is, in the present embodiment, the vehicle is configured to be able to perform automatic driving only with a control command value computed by the travel control device 100.

The steering unit 120 is a mechanism that steers a front wheel, and changes an angle of the front wheel in response to a steering operation of the driver Further, the steering unit 120 changes the angle of the front wheel according to a steering assist command value computed in the control command computation unit 114 to change a traveling direction of the vehicle. The braking unit 121 brakes the vehicle according to an acceleration command value (braking command value) for the vehicle, which has been computed in the control command computation unit 114. Note that the steering unit 120 may be configured to have mechanical coupling with the operation unit such as a steering wheel, and to enable the driver to directly adjust a steering angle.

The braking unit 121 is configured from a pump that discharges a high-pressure brake fluid, and an electromagnetic valve for supplying the brake fluid to wheel cylinders of wheels while adjusting a pressure of the brake fluid. The braking unit 121 changes a braking force in response to accelerator and braking operations of the driver. Further, the braking unit 121 brakes the vehicle according to an acceleration command value (braking command value) for the vehicle, which has been computed in the control command computation unit 114.

The braking and driving unit 122 is configured from an engine system that can vary a driving force of the vehicle according to a drive command value, and an electric motor system. The braking and driving unit 122 changes the braking and driving forces in response to the accelerator and brake operations of the driver. Further, the braking and driving unit 122 brakes and drives the vehicle according to the acceleration command value for the vehicle, which has been computed in the control command computation unit 114. In a case of using the electric motor system as the braking and driving unit 122, a part of braking performance required for the braking unit 121 can be shared and performed with braking by regeneration.

The outside world recognition unit 123 is configured from an imaging device such as a stereo camera or a monocular camera, for example. The outside world recognition unit 123 detects a lane marker such as a white line or an orange line existing around the own vehicle, calculates a target traveling path on the basis of the position of the detected lane marker, and transmits the calculated target traveling path to the control command computation unit 114.

Note that the outside world recognition unit 123 may include a GPS navigation device. In a case of configuring the outside world recognition unit 123 from the imaging device, a physically recognizable range of the white line or the orange line may be restricted during traveling on a curved road, for example. In such a case, the target traveling path that can be calculated by the outside world recognition unit 123 is restricted according to the range recognizable by the outside world recognition unit 123.

However, in a case where the outside world recognition unit 123 includes the GPS navigation device, the outside world recognition unit 123 can check up position information obtained in a GPS satellite, and map information in an in-vehicle terminal or dynamic map data obtained through communication. With the configuration, the outside world recognition unit 123 can function to acquire course shape information in front, information of traffic lights, and road sign information, in addition to the information from the imaging device, improve a range and accuracy of the target traveling path on the basis of a result of the acquisition, and transmit the target traveling path to the control command computation unit 114.

The display unit 124 is configured from a liquid crystal display used in a display unit of a car navigation system, and displays a control state and the like on request. The travel control device 100 of the present embodiment informs the driver that steering assist and assist by deceleration are to be applied, on the display unit 124.

The steering unit 120 steers the front wheel, the braking unit 121 brakes the vehicle, and the braking and driving unit 122 brakes or drives the vehicle, according to a control command value computed by the travel control device 100 on the basis of the above configuration. The CAN can be used for transmission of information between the travel control device 100 for a vehicle, and the steering unit 120, the braking unit 121, the braking and driving unit 122, the outside world recognition unit 123, and the display unit 124.

In the present embodiment, the travel control device 100, and the braking unit 121 and the braking and driving unit 122 are described as separate configurations. However, the travel control device 100 and the steering unit 120 may be combined as one system. Further, the travel control device 100 and the braking unit 121 of the vehicle may be combined as one system. The travel control device 100 and the braking and driving unit 122 of the vehicle may be combined as one system. Further, all the travel control device 100, the steering unit 120, the braking unit 121, and the braking and driving unit 122 of the vehicle may be combined as one system.

Figure 2:
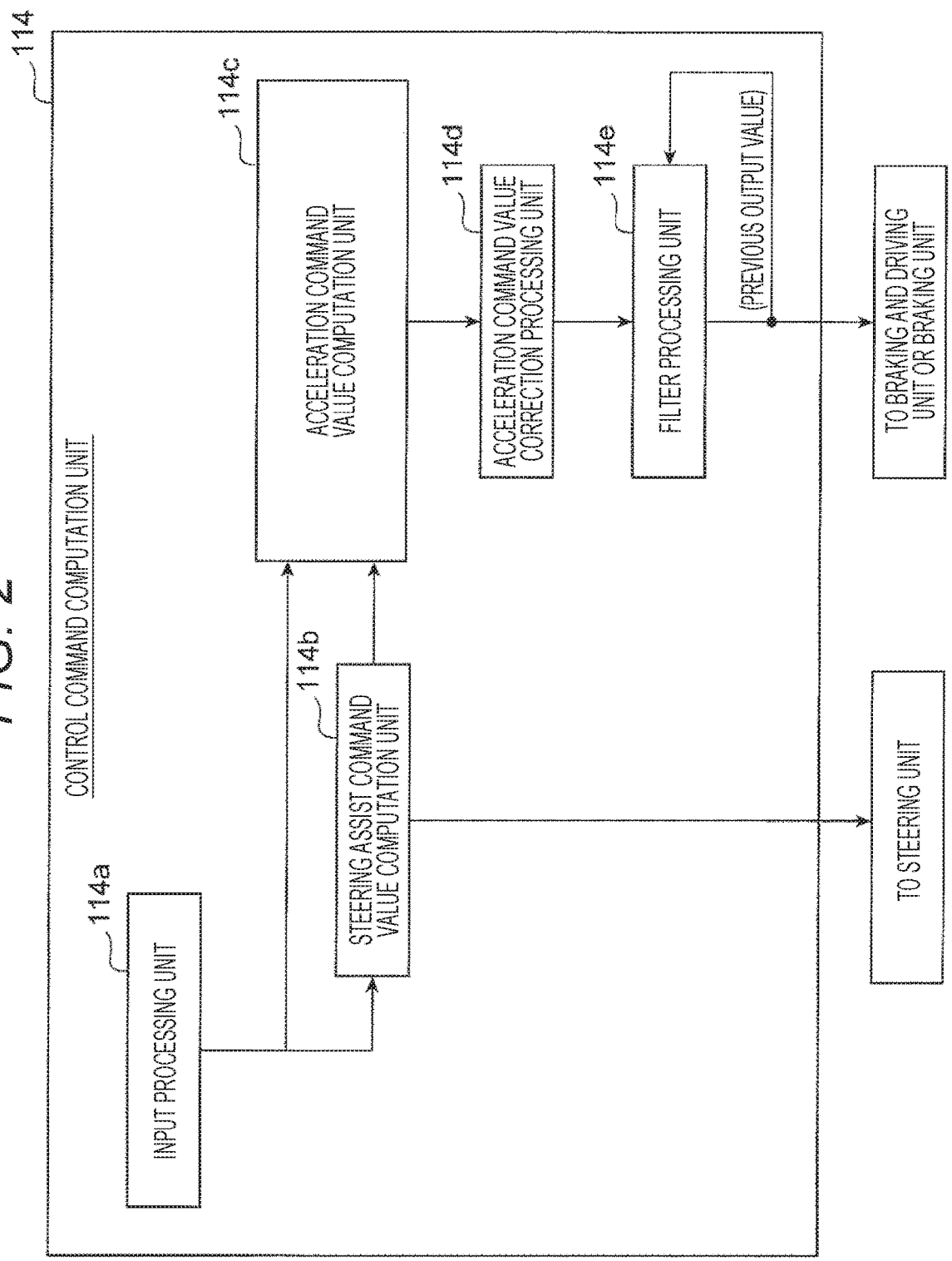
FIG. 2 is an internal block diagram of a control command computation unit illustrated in FIG. 1.

FIG. 2 is an internal block diagram of the control command computation unit 114 illustrated in FIG. 1. In the travel control device for a vehicle of the present embodiment, the control command computation unit 114 includes an input processing unit 114*a*, a steering assist command value computation unit 114*b*, an acceleration command value computation unit 114*c*, an acceleration command value correction processing unit 114*d*, and a filter processing unit 114*e*. These units are configured from electronic components such as a CPU, a ROM, a RAM, and input/output ports.

The input processing unit 114*a* processes information output from the driver operation information acquisition unit 111, the vehicle motion information acquisition unit 112, and the outside world information acquisition unit 113 illustrated in FIG. 1, and transmits the information to the steering assist command value computation unit 114*b* and the acceleration command value computation unit 114*c*. The steering assist command value computation unit 114b calculates a steering assist amount as the steering assist command value on the basis of the information received from the input processing unit 114a, and transmits the calculated steering assist amount to the steering unit 120 as a control command. Further, the steering assist command value computation unit 114b transmits the calculated steering assist amount to the acceleration command value computation unit 114c.

The acceleration command value computation unit 114c computes the acceleration command value according to the information received from the input processing unit 114a and the steering assist amount received from the steering assist command value computation unit 114b, and transmits the obtained acceleration command value to the acceleration command value correction processing unit 114d. That is, in the present embodiment, the acceleration command value computation unit 114c is the acceleration command value computation unit 114c according to the steering assist amount.

The acceleration command value correction processing unit 114d corrects the acceleration command value according to the steering assist amount, which has been calculated in the acceleration command value computation unit 114c. The filter processing unit 114e feeds back a previous output value that has been output in previous processing, and calculates a final acceleration command value that is a processed acceleration command value with a low pass filter (LPF), the acceleration command value having been corrected in the acceleration command value correction processing unit 114d, and transmits the obtained final acceleration command value to the braking unit 121 or the braking and driving unit 122.

Figure 3:
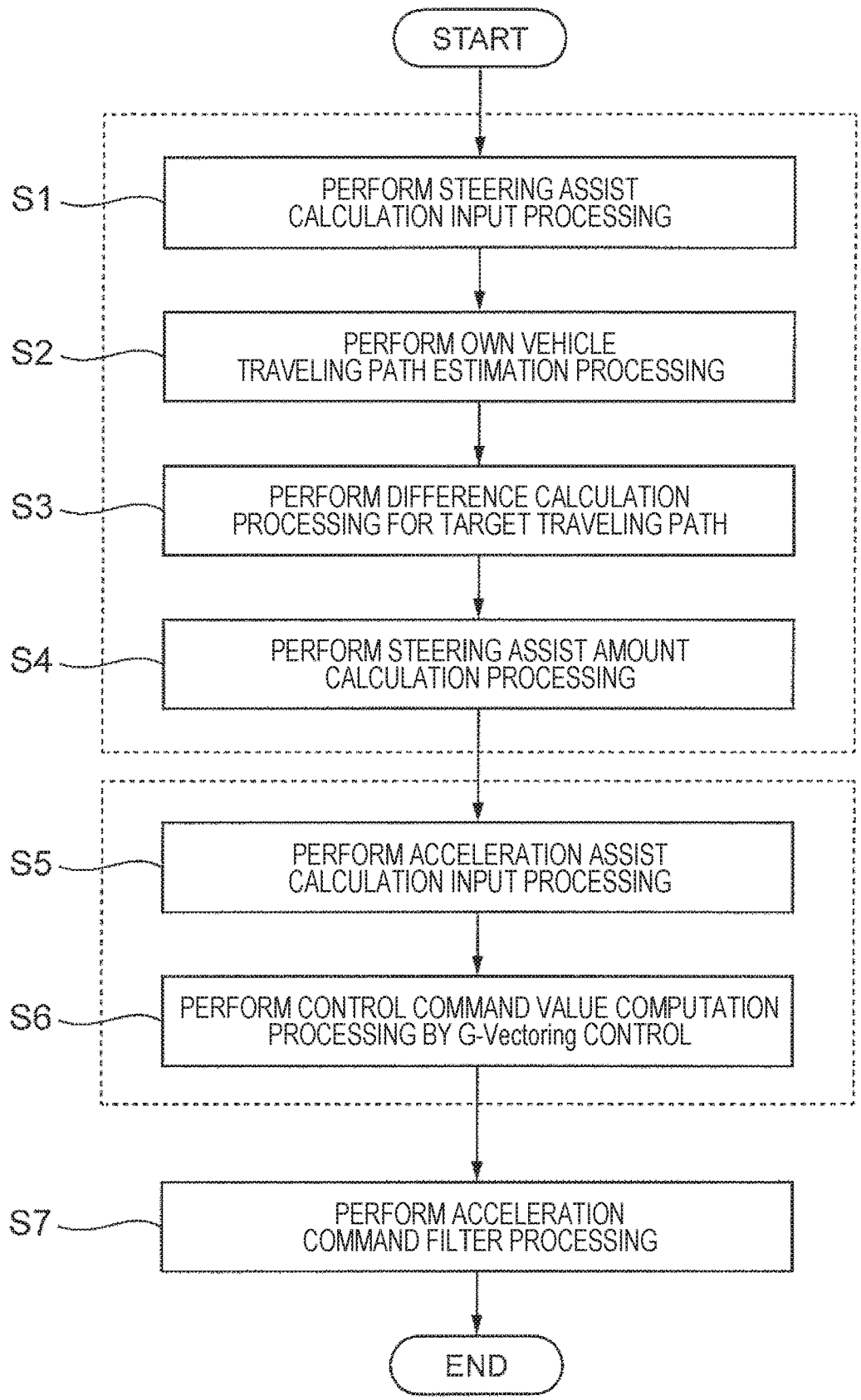
FIG. 3 is a flowchart illustrating processing of the control command computation unit illustrated in FIG. 2.

FIG. 3 is a flowchart illustrating specific processing in the control command computation unit 114 illustrated in FIG. 2. The control command computation unit 114 is set to repeat the routine illustrated in FIG. 3 at predetermined time intervals.

The control command computation unit 114 first executes steering assist calculation input processing S1. In the steering assist calculation input processing S1, the control command computation unit 114 converts information measured in the driver operation information acquisition unit 111 and the vehicle motion information acquisition unit 112 and information of a vehicle going ahead received from the outside world recognition unit 123 into a data format to be used in subsequent processing. To be specific, the control command computation unit 114 performs, by the input processing unit 114a, conversion processing of a unit of measurement and time differential processing for an input signal, and processing of calculating a new physical amount by computation with a known physical expression.

Next, the control command computation unit 114 executes own vehicle traveling path estimation processing S2. In the own vehicle traveling path estimation processing S2, the control command computation unit 114 estimates a traveling path of the own vehicle on the basis of vehicle motion information such as the steering angle, the vehicle speed, and the yaw rate, and known vehicle dimensions. Estimation of the own vehicle is performed by calculation of a lateral position of the own vehicle at a front gaze distance that is a predetermined distance in front of the vehicle, using the steering assist command value computation unit 114b, for example. The front gaze distance is set to a position that the own vehicle reaches after a few seconds (for example, about two seconds).

In a case of using a coordinate system including an X axis extending in a vehicle width direction and a Z axis extending in front of the vehicle, where the center of gravity of the own vehicle is used as the origin, an estimated lateral position x(z(n)) of the center of gravity of the own vehicle at a front gaze distance z(n) can be obtained by an expression (1) below.

[Expression 1]

$$x(z(n)) = \frac{\delta \cdot z(n)^2}{2(1 + AV^2) \cdot l_w \cdot n_{sgr}} \quad (1)$$

Note that, in the expression (1), z(n) is the front gaze distance that is a predetermined distance in front of the vehicle, x(z(n)) is the estimated lateral position at the front gaze distance, δ is the steering angle of the vehicle, A is a stability factor, V is the vehicle speed, $l_w$ is a wheel base of the vehicle, and $n_{sgr}$ is a steering gear ratio of the vehicle.

Next, the control command computation unit 114 executes difference calculation processing S3 for a target traveling path. In the difference calculation processing S3, the control command computation unit 114 obtains a difference between the calculated estimated lateral position x(z(n)) of the center of gravity of the own vehicle and the target traveling path detected in the outside world recognition unit 123, using the steering assist command value computation unit 114b, for example, and calculates a lateral displacement amount of the estimated lateral position x(z(n)) from the target traveling path at the front gaze distance z(n) on the basis of the difference. Further, in the difference calculation processing S3, the control command computation unit 114 performs time differential processing for the lateral displacement amount of the estimated lateral position x(z(n)) from the target traveling path at the front gaze distance z(n), using the steering assist command value computation unit 114b, for example, to calculate a lateral displacement speed from the target traveling path.

Next, the control command computation unit 114 performs steering assist amount calculation processing S4. In the steering assist amount calculation processing S4, the control command computation unit 114 calculates a steering assist amount M. To be specific, the control command computation unit 114 calculates the steering assist amount M on the basis of an expression (2) below by the steering assist command value computation unit 114b.

[Expression 2]

$$M = \sum_{t=0}^{n} \left( Ka_{z(n)} \cdot X_{diffz(n)} + Kb_{z(n)} \cdot dX_{diffz(n)} \right) \quad (2)$$

Note that, in the expression (2), z(n) is the front gaze distance, $X_{diffz(n)}$ is the lateral displacement amount of the estimated lateral position x(z(n)) from the target traveling path, $Ka_{z(n)}$ is a proportional gain according to the lateral displacement amount $X_{diffz(n)}$, $dX_{diffz(n)}$ is the lateral displacement speed of the estimated lateral position x(z(n)) from the target traveling path, and $Kb_{z(n)}$ is a proportional gain according to the lateral displacement speed $dX_{diffz(n)}$.

Note that the front gaze distance z(n) used in the expression (2) indicates front gaze distances z(n) at a plurality of appropriately divided points, and values can be appropriately set according to a system to be used for the outside world recognition unit 123. That is, a cumulative number n of when calculating the steering assist amount M can be set on the basis of outside world information. Further, the most distant front gaze distance z(n) is desirably made variable according to the vehicle speed in accordance with the driver's sensibility. That is, when the vehicle speed V of the own vehicle is high, the front gaze distance z(n) is set in consideration of up to more distant point. That is, the cumulative number n of when calculating the steering assist amount M can be set on the basis of the outside world information.

However, as described above, the detectable target traveling path depends on a performance of a sensor, a traveling status of the own vehicle such as a curved road or a straight road, and weather such as clear weather, wet weather, or fog. Therefore, a case in which the target traveling path is insufficient for a maximum value of the front gaze distance z(n) set according to the vehicle speed V of the own vehicle can be considered. In such a case, a range to be calculated by the expression (2) is limited in accordance with the detected maximum target traveling path. That is, the control command computation unit 114 can set the front gaze distance z(n) according to the vehicle speed V of the own vehicle, and sets the cumulative number n of when calculating the steering assist amount according to the front gaze distance, and can set the cumulative number n of when calculating the steering assist amount M according to the front gaze distance z(n).

Further, in a case where the own vehicle travels on a curved road in spite of a condition in which the vehicle speed V of the own vehicle is high and the front gaze distance z(n) needs to be considered up to a more distant point. Therefore, the proportional gain can be corrected according to dissociation between the maximum value of the front gaze distance z(n) according to the vehicle speed V of the own vehicle and a maximum value of the detected target traveling path.

In the present embodiment, in the steering assist amount calculation processing S4, the control command computation unit 114 calculates a necessary yaw moment as the steering assist amount M based on the expression (2) by the steering assist command value computation unit 114b. Further, the control command computation unit 114 transmits, to the steering unit 120, the control command value converted by the steering assist command value computation unit 114b into a steering angle or steering torque in response to a request of the steering unit 120.

Next, the control command computation unit 114 executes acceleration assist calculation input processing S5. In the acceleration assist calculation input processing S5, the control command computation unit 114 converts the information measured in the driver operation information acquisition unit 111 and the vehicle motion information acquisition unit 112 into a data format to be used in subsequent processing. To be specific, the control command computation unit 114 performs, by the input processing unit 114a, conversion processing of a unit of measurement and time differential processing for an input signal, and processing of calculating a new physical amount by computation with a known physical expression. The control command computation unit 114 receives, by the acceleration command value computation unit 114c, the information transmitted from the input processing unit 114a.

Further, in the acceleration assist calculation input processing S5, the control command computation unit 114 receives, by the acceleration command value computation unit 114c, the steering angle or the steering torque as the steering assist amount M transmitted from the steering assist command value computation unit 114b. Further, the control command computation unit 114 calculates, by the acceleration command value computation unit 114c, a yaw rate and lateral acceleration generated in the vehicle according to the received steering assist amount M on the basis of a known physical expression. After that, the acceleration command value computation unit 114c performs time differential processing for the obtained yaw rate and lateral acceleration to calculate yaw acceleration and lateral jerk.

Next, the control command computation unit 114 executes control command value computation processing S6 by G-Vectoring (registered trademark) control. In the control command value computation processing S6, the control command computation unit 114 calculates, by the acceleration command value computation unit 114c, an acceleration command value Gx on the basis of an expression (3) below. Note that, in the expression (3) below, Gy is the lateral acceleration [G] of the vehicle, and Gy with a dot sign "." above Gy, that is, Gy dot is the lateral jerk [G/s] of the vehicle. Further, Cxy is a control gain, T is a temporary delay time constant, and s is a Laplace operator.

[Expression 3]

$$G_x = -\mathrm{sgn}(Gy \cdot \dot{G}y)\frac{C_{xy}}{1+Ts}|\dot{G}y| \tag{3}$$

In the present embodiment, as the lateral acceleration Gy of the vehicle and the lateral jerk Gy dot of the vehicle used in the expression (3) above, the calculated results in the acceleration assist calculation input processing S5 are used. As the lateral acceleration Gy and the lateral jerk Gy dot, the yaw rate and the lateral acceleration detected in the vehicle motion information acquisition unit 112 and time differential results thereof may be used.

Next, the control command computation unit 114 executes acceleration command filter processing S7. The control command computation unit 114 corrects, by the acceleration command value correction processing unit 114d, the acceleration command value Gx calculated by the acceleration command value computation unit 114c. The control command computation unit 114 performs calculation, by the filter processing unit 114e, on the basis of an expression (4) below, from the corrected acceleration command value Gx and a previous value Gx_Out_Z1 of the acceleration command value that is a fed back previous value of the filter-processed acceleration command value Gx_Out.

[Expression 4]

$$\mathrm{Gx\_Out} = \frac{T_0}{Tb} \cdot Gx + \left(1 - \frac{T_0}{Tb}\right) \cdot \mathrm{Gx\_Out\_Z1} \tag{4}$$

Note that, in the expression (4), Gx_Out is the filter-processed acceleration command value [G], Gx is the acceleration command value [G], Gx_Out_Z1 is the previous value [G] of the filter-processed acceleration command value, $T_0$ is a sampling time [sec], and Tb is an output filter time constant [sec]. In the present embodiment, as the filter processing, low-pass filter processing with a primary infinite impulse response (IIR) filter is used. This is to prevent sudden change of an output value of the acceleration command value Gx at the time of switching of the corrected acceleration command value Gx. Even if another filter processing is used, the essential effect according to the present embodiment is not changed.

Figure 4:
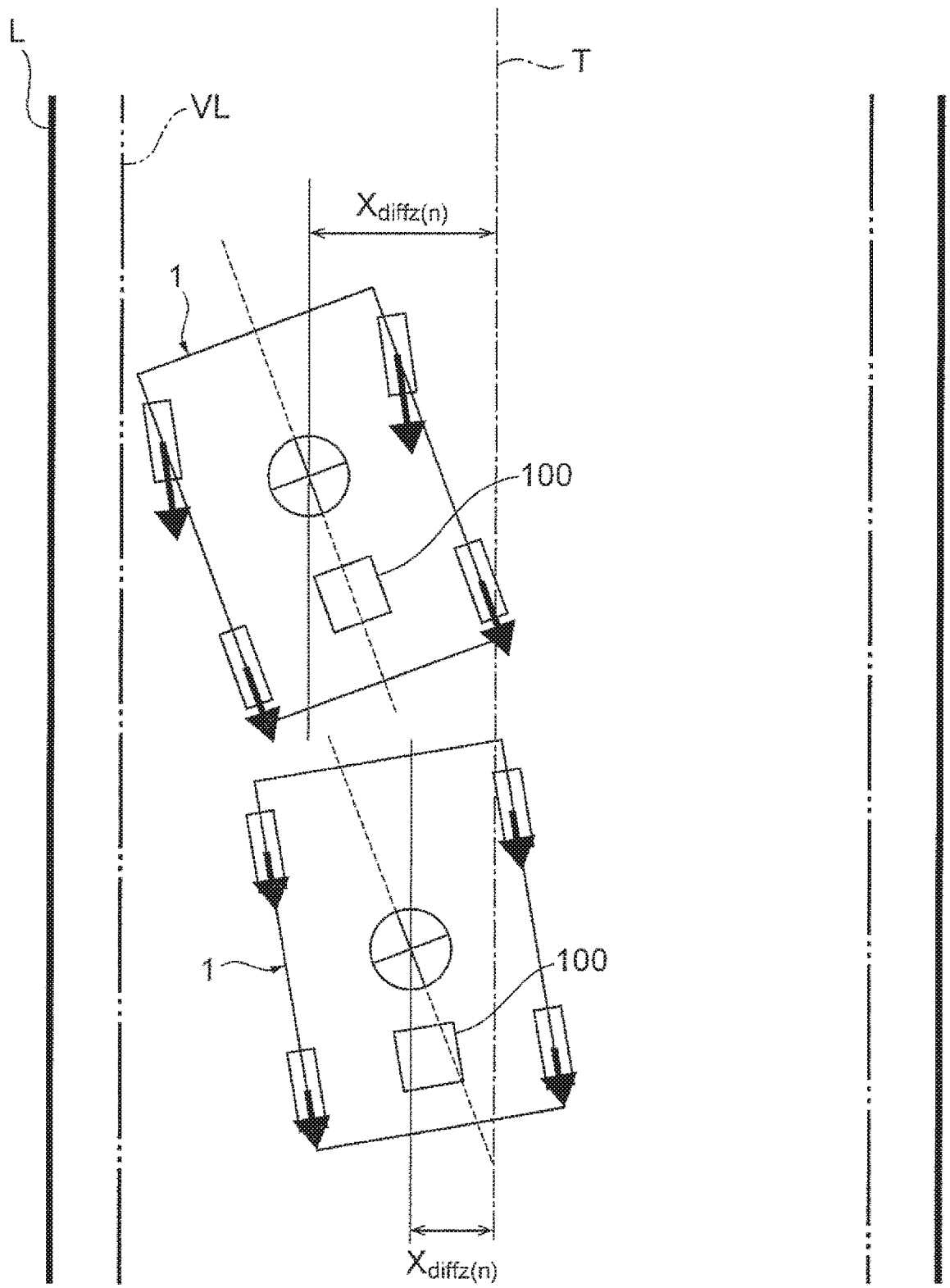
FIG. 4 is a schematic diagram illustrating a state at the time of curve traveling of a vehicle in which the travel control device of FIG. 1 is mounted.

FIG. 4 is a schematic diagram illustrating a state at the time of curve traveling of a vehicle 1 in which the travel control device 100 of FIG. 1 is mounted. In the present embodiment, the travel control device 100 performs the processing from the steering assist calculation input processing S1 to the acceleration command filter processing S7 illustrated in FIG. 3.

That is, the travel control device 100 calculates, as described above, the steering assist amount M according to the lateral displacement amount $X_{diffz(n)}$ of the estimated lateral position x(z(n)) from the target traveling path and transmits the steering assist amount M to the steering unit 120.

Further, the travel control device 100 calculates the yaw acceleration, the lateral jerk, and the like on the basis of the calculated steering assist amount M, calculates the acceleration command value Gx by the G-Vectoring control, and calculates the acceleration command value Gx_Out, and transmits the calculated results to the braking unit 121 or the braking and driving unit 122.

With the processing, the vehicle 1 can perform steering assist according to the steering assist amount M by the steering unit 120, and can perform equivalent acceleration control, that is, acceleration or deceleration according to the steering assist amount M, for the four wheels, in cooperation with the steering assist, by the braking unit 121 or the braking and driving unit 122. By performing the acceleration or deceleration in cooperation with the steering assist amount M in this way, the longitudinal acceleration and the lateral acceleration of the vehicle 1 are composited, and the G-Vectoring control in which composite acceleration transitions to draw an arc can be realized. Therefore, according to the travel control device 100 for the vehicle 1 of the present embodiment, the vehicle 1 can be comfortably and safely controlled without providing the driver with an uncomfortable feeling.

Note that the travel control device 100 may inform the driver that the control has been performed on the display unit 124 (see FIG. 1) included in the vehicle 1, when the travel control device 100 has performed the steering assist according to the steering assist amount M and the acceleration control according to the steering assist amount M.

Figure 6:
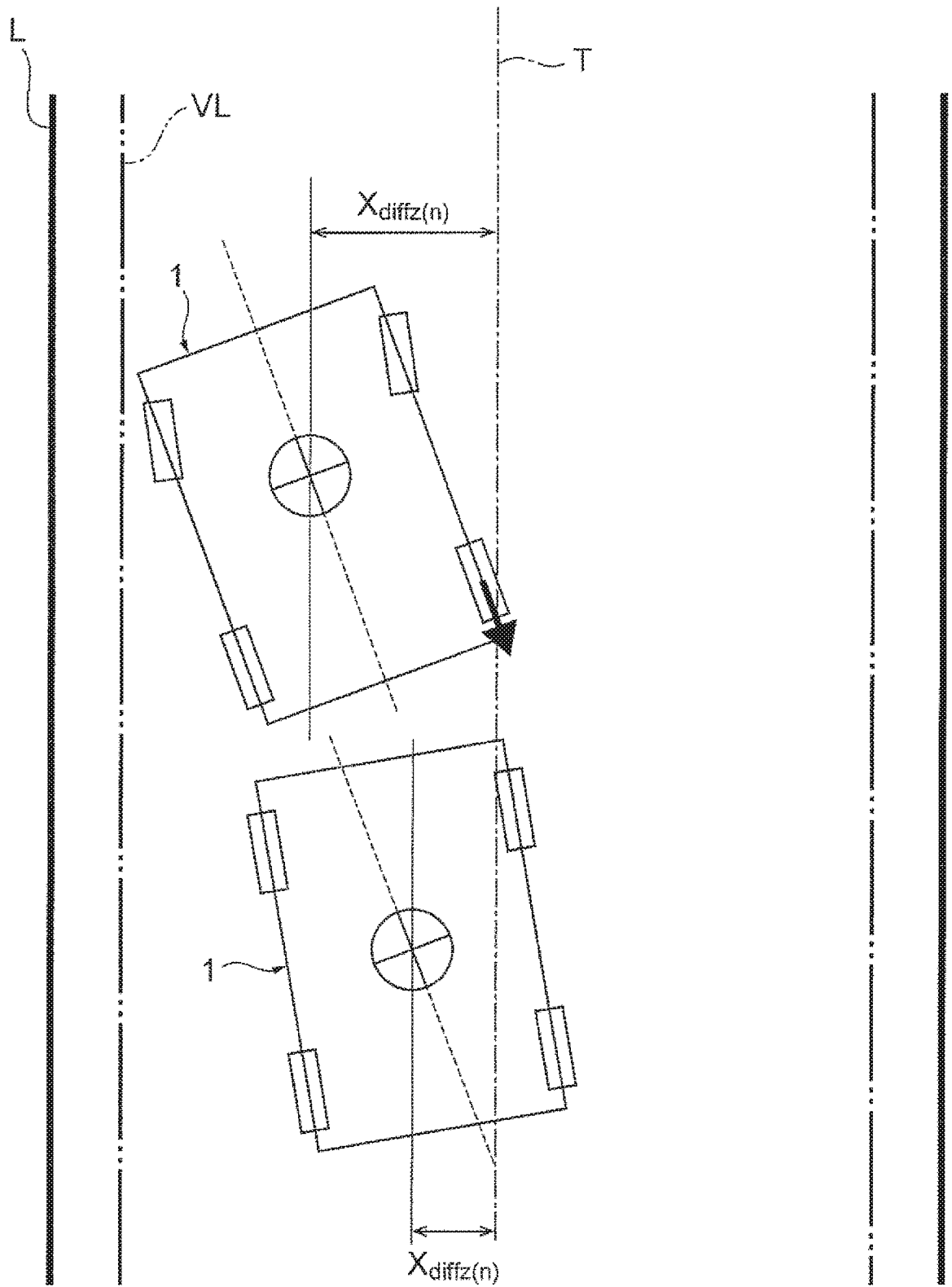
FIG. 6 is a schematic diagram illustrating a state at the time of curve traveling of a conventional vehicle.

Hereinafter, traveling control of a conventional vehicle will be described for comparison with the travel control device 100 for a vehicle of the above-described present embodiment. FIG. 6 is a schematic diagram illustrating a state at the time of curve traveling of a conventional vehicle.

In the traveling control of the conventional vehicle, when a lateral displacement amount $X_{diffz(n)}$ from a target traveling path becomes larger than a predetermined set value, a difference in braking force is generated between right and left wheels, and a yaw moment is generated. Meanwhile, when the lateral displacement amount $X_{diffz(n)}$ from a target traveling path becomes smaller than the predetermined set value, control is performed only by steering assist. In such traveling control of the conventional vehicle, when the difference in braking force is generated in the right and left wheel and the yaw moment is generated, a yaw moment unrelated to lateral movement of the own vehicle is directly applied. Therefore, such control provides a driver of the vehicle with a feeling sort of rotation at the site, which is more likely to lead to an uncomfortable feeling for the driver.

Therefore, the traveling control method of the conventional vehicle is difficult to be sequentially used in every domain from lane maintenance control as a control domain close to a regular use region to lane deviation prevention control close to a marginal domain. Further, in a case where the vehicle is in an understeer trend due to over speed, that is, in a state close to the marginal domain, decreasing a vehicle speed is important. However, the deceleration is performed only with one wheel inside the turn, of rear wheels, or front and rear two wheels inside the turn, and tire forces cannot be sufficiently used as compared with a case of using four wheels, and the vehicle speed may not be sufficiently decreased.

In contrast, the travel control device 100 for a vehicle of the present embodiment performs the above-described G-Vectoring control, thereby to comfortably and safely control the vehicle without providing the driver with an uncomfortable feeling. Further, seamless operation of the travel control device 100 from the regular use region to the marginal region becomes possible, and turning of the vehicle 1 can be more safely assisted. Further, by use of the tire forces of the four wheels of the vehicle 1, the vehicle speed can be decreased in the marginal region, and the safety can be enhanced.

In the present embodiment, the expression used in the control command value computation processing S6 by the G-Vectoring control is not limited to the expression (3). For example, in the control command value computation processing S6, an expression (5) or an expression (6) below can be used in place of the expression (3).

[Expression 5]

$$G_x = -C_2 \cdot \frac{d}{dt}(\gamma) \qquad (5)$$

[Expression 6]

$$G_x = -C_3 \cdot \frac{d}{dt}(\delta) \qquad (6)$$

Note that, in the expression (5), Gx is the acceleration command value [G], $C_2$ is the proportional gain, and γ is the yaw rate. Further, in the expression (6), Gx is the acceleration command value [G], $C_3$ is the proportional gain, and δ is the steering angle. By use of the expression (5) or (6) having a simpler configuration than the expression (3), a calculation speed of the steering assist command value computation unit 114b can be improved, for example.

[Second Embodiment]

Figure 5:
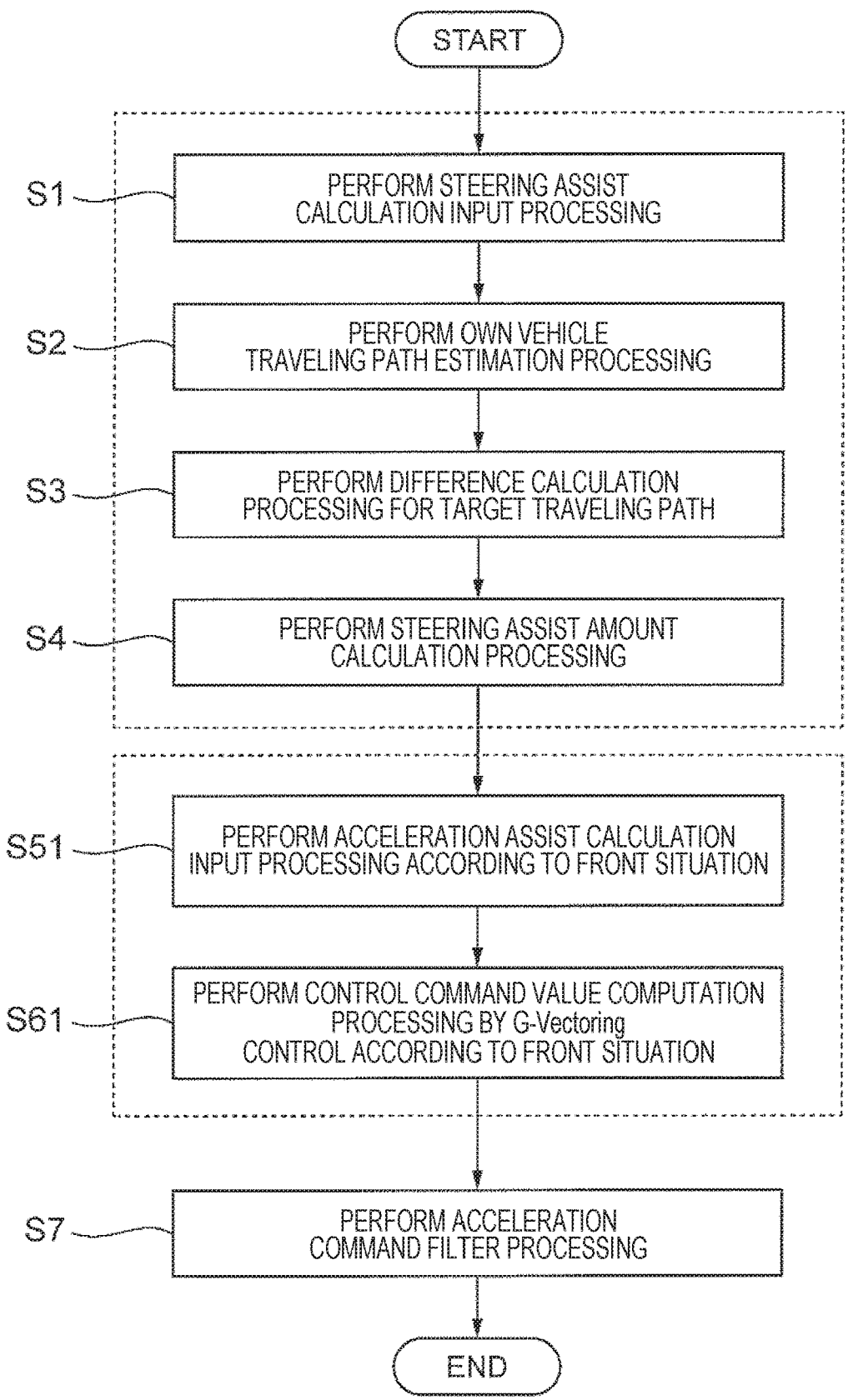
FIG. 5 is a flowchart illustrating processing of a control command computation unit according to a second embodiment.

Hereinafter, a second embodiment of a travel control device for a vehicle of the present invention will be described using FIG. 5 with reference to FIGS. 1, 2, and 4. FIG. 5 is a flowchart illustrating processing of a control command computation unit 114 of a travel control device 100 according to the second embodiment.

The travel control device for a vehicle of the present embodiment is different from the travel control device 100 for a vehicle described in the first embodiment in execution of acceleration assist calculation input processing S51 and control command value computation processing S61 according to a front situation of the vehicle illustrated in FIG. 5, in place of the acceleration assist calculation input processing S5 and the control command value computation processing S6 illustrated in FIG. 3 of the first embodiment. Other points of the travel control device for a vehicle of the present embodiment are the same as those of the travel control device 100 for a vehicle described in the first embodiment. Therefore, the same portion is denoted with the same sign and description is omitted.

The travel control device for a vehicle of the present embodiment executes processing from steering assist calculation input processing S1 to steering assist amount calculation processing S4, and calculates a steering assist amount M by an steering assist command value computation unit 114*b* of the control command computation unit 114, similarly to the travel control device 100 of the first embodiment. Further, the steering assist command value computation unit 114*b* transmits the calculated steering assist amount M to a steering unit 120 and an acceleration command value computation unit 114*c*.

Next, the control command computation unit 114 executes acceleration assist calculation input processing S51 according to a front situation of the vehicle. In the acceleration assist calculation input processing S51, the control command computation unit 114 calculates lateral acceleration that is generated at every front gaze distance z(n) when traveling in a target traveling path while keeping a current vehicle speed, on the basis of a known physical expression by the acceleration command value computation unit 114*c*. Further, the control command computation unit 114 calculates lateral jerk that is generated at every front gaze distance z(n) by differentiating the calculated lateral acceleration by the acceleration command value computation unit 114*c*.

Next, the control command computation unit 114 executes control command value computation processing S61 by the G-Vectoring control according to the front situation of the vehicle. In the control command value computation processing S61, the control command computation unit 114 calculates, by the acceleration command value computation unit 114*c*, an acceleration command value Gx on the basis of an expression (7) below.

[Expression 7]

$$G_x = -\sum_{t=0}^{n}\left(-\text{sgn}(Gy_{(z(n))} \cdot \dot{Gy}_{(z(n))}) \frac{Cxy_{(z(n))}}{1+Ts} |\dot{Gy}_{(z(n))}|\right) \quad (7)$$

Note that, in the expression (7), Gx is the acceleration command value [G], z(n) is the front gaze distance, Gy(z(n)) is the lateral acceleration [G] of the vehicle at the front gaze distance z(n). Further, $Gy_{(z(n))}$ with a dot sign "." above Gy, that is, $Gy_{(z(n))}$ dot is the lateral jerk [G/s] of the vehicle at the front gaze distance z(n). Further, $Cxy_{(z(n))}$ is a control gain at the front gaze distance z(n), T is a temporary delay time constant, and s is a Laplace operator.

Note that the front gaze distance z(n) used in the expression (7) indicates front gaze distances z(n) at a plurality of appropriately divided points, and values can be appropriately set according to a system to be used for the outside world recognition unit 123. Further, the most distant front gaze distance z(n) is desirably made variable according to the vehicle speed according to the vehicle speed of the own vehicle in accordance with the driver's sensibility. That is, when the vehicle speed of the own vehicle is high, the front gaze distance z(n) is set in consideration of up to more distant point.

However, as described above, a detectable target traveling path depends on performance of a sensor, a traveling status such as a curved road or a straight road, and the weather such as clear weather, wet weather, or fog. Therefore, restriction is caused in the acceleration and the lateral jerk at the front gaze distance z(n) calculable in the acceleration assist calculation input processing S51. Therefore, a case in which the target traveling path is insufficient for a maximum value of the front gaze distance z(n) set according to the vehicle speed V of the own vehicle can be considered. In such a case, a range to be calculated by the expression (7) is limited in accordance with the detected maximum target traveling path. That is, the control command computation unit 114 can set the front gaze distance z(n) according to the vehicle speed V of the own vehicle, and can set a cumulative number n of when calculating the acceleration command value Gx according to the front gaze distance z(n).

Further, in a case where the own vehicle travels on a curved road in spite of a condition in which the vehicle speed V of the own vehicle is high and the front gaze distance z(n) needs to be considered up to a more distant point. Therefore, the proportional gain can be corrected according to dissociation between the maximum value of the front gaze distance z(n) according to the vehicle speed V of the own vehicle and the maximum value of the detected target traveling path.

As described above, according to the travel control device for a vehicle of the present embodiment, effects similar to these of the travel control device 100 of the first embodiment can be obtained. Further, the travel control device for a vehicle of the present embodiment executes acceleration assist calculation input processing S51 according to a front situation of the vehicle and control command value computation processing S61 by G-Vectoring control according to the front situation of the vehicle. With the processing, as compared with the travel control device 100 of the above-described first embodiment, the uncomfortable feeling of the driver can be decreased and the vehicle can be more comfortably and safely controlled.

The embodiments of the present invention have been described in details using the drawings. However, specific configurations are not limited to the embodiments, and design change and the like without departing from the gist of the present invention are also included in the present invention.

For example, the above-described embodiments have been made in detail for easy-to-understand description of the present invention, and the present invention is not necessarily limited to those having all the described configurations. Further, a part of a configuration of a certain embodiment can be replaced with a configuration of another embodiment. Further, a configuration of another embodiment can be added to a configuration of a certain embodiment. Further, another configuration can be added to, deleted from, or replaced with a part of the configurations of the embodiments.

To be specific, in the above-described embodiments, the G-Vectoring control has been described as the travel control algorithm. However, the travel control algorithm is not limited to the G-Vectoring. The travel control algorithm may be, for example, adaptive cruise control (ACC) or pre-crash control, or may be a combination of these two or more types of control.

Further, a part or all of the above-described configurations, functions, processing units, and the like may be designed with an integrated circuit and realized by hardware. Further, the above-described configurations and functions may be realized by software by interpretation of a program that realizes the respective functions by a processor. Information of programs, tables, files, and the like that realize the functions can be placed in a memory, a hard disk, a recording device such as a solid state drive (SSD), or a recording medium such as an IC card, an SD card, or a DVD.

REFERENCE SIGNS LIST 1 vehicle
100 travel control device
114 control command computation unit
Gx acceleration command value
Gy lateral acceleration
Gy dot lateral jerk
M steering assist amount
T target traveling path
x(z(n)) estimated lateral position
z(n) front gaze distance

The invention claimed is:

1. A travel control device for a vehicle comprising:
a control command computation unit configured to calculate a steering assist amount for assisting steering of the vehicle and an acceleration command value for controlling braking and driving forces of the vehicle, wherein
the control command computation unit
calculates an estimated lateral position of the vehicle at a front gaze distance of the vehicle,
calculates a lateral displacement amount from a target traveling path and a lateral displacement speed, of the vehicle at the estimated lateral position,
calculates the steering assist amount on the basis of the lateral displacement amount and the lateral displacement speed,
calculates lateral acceleration and lateral jerk generated in the vehicle according to the steering assist amount, and
calculates the acceleration command value according to the lateral acceleration and the lateral jerk; and
wherein the control command computation unit calculates the estimated lateral position on the basis of an expression (1) below:

[Expression 1]

$$x(z(n)) = \frac{\delta \cdot z(n)^2}{2(1+AV^2) \cdot l_w \cdot n_{sgr}} \quad (1)$$

where x(z(n)) is the estimated lateral position, z(n) is the front gaze distance, δ is a steering angle of the vehicle, A is a stability factor, V is a vehicle speed of the vehicle, $l_w$ is a wheel base of the vehicle, and $n_{sgr}$ is a steering gear ratio of the vehicle.

2. The travel control device for a vehicle according to claim 1, wherein the control command computation unit calculates the steering assist amount on the basis of an expression (2) below:

[Expression 2]

$$M = \sum_{t=0}^{n} \left( Ka_{z(n)} \cdot X_{diff_{z(n)}} + Kb_{z(n)} \cdot dX_{diff_{z(n)}} \right) \quad (2)$$

where M is the steering assist amount, z(n) is the front gaze distance, $X_{diff_{z(n)}}$ is the lateral displacement amount, $Ka_{z(n)}$ is a proportional gain according to the lateral displacement amount, $dX_{diff_{z(n)}}$ is the lateral displacement speed, and $Kb_{z(n)}$ is a proportional gain according to the lateral displacement speed.

3. The travel control device for a vehicle according to claim 2, wherein the control command computation unit sets the front gaze distance according to the vehicle speed of the vehicle, and sets a cumulative number n of when calculating the steering assist amount according to the front gaze distance.

4. The travel control device for a vehicle according to claim 1, wherein the control command computation unit calculates the acceleration command value on the basis of an expression (3) below:

[Expression 3]

$$G_x = -\text{sgn}(Gy \cdot \dot{G}y) \frac{C_{xy}}{1+Ts} |\dot{G}y| \quad (3)$$

where Gy is the lateral acceleration, Gy dot is the lateral jerk, $C_{xy}$ is a control gain, T is a temporary delay time constant, and s is a Laplace operator.

5. The travel control device for a vehicle according to claim 4, wherein the control command computation unit performs filter processing for the acceleration command value on the basis of an expression (4) below:

[Expression 4]

$$Gx\_Out = \frac{T_0}{Tb} \cdot Gx + \left(1 - \frac{T_0}{Tb}\right) \cdot Gx\_Out\_Z1 \quad (4)$$

where Gx_Out is the filter-processed acceleration command value, Gx is the acceleration command value, Gx_Out_Z1 is a previous value of the filter-processed acceleration command value, $T_0$ is a sampling time [sec], and Tb is an output filter time constant [sec].

6. The travel control device for a vehicle according to claim 1, wherein the control command computation unit calculates the acceleration command value on the basis of an expression (5) below:

[Expression 5]

$$G_x = -C_2 \cdot \frac{d}{dt}(\gamma) \quad (5)$$

where Gx is the acceleration command value, $C_2$ is a proportional gain, and γ is a yaw rate.

7. The travel control device for a vehicle according to claim 1, wherein the control command computation unit calculates the acceleration command value on the basis of an expression (6) below:

[Expression 6]

$$G_x = -C_3 \cdot \frac{d}{dt}(\delta) \quad (6)$$

where Gx is the acceleration command value, $C_3$ is a proportional gain, and δ is a steering angle of the vehicle.

8. The travel control device for a vehicle according to claim 1, wherein the control command computation unit calculates the acceleration command value on the basis of an expression (7) below:

[Expression 7]

$$G_x = -\sum_{t=0}^{n} \left( -\text{sgn}(Gy_{(z(n))} \cdot G\dot{y}_{(z(n))}) \frac{Cxy_{(z(n))}}{1+Ts} |G\dot{y}_{(z(n))}| \right) \quad (7)$$

where Gx is the acceleration command value, z(n) is the front gaze distance, and Gy(z(n)) is the lateral acceleration.

9. The travel control device according to claim 8, wherein the control command computation unit sets the front gaze distance according to the vehicle speed of the vehicle, and sets a cumulative number n of when calculating the acceleration command value according to the front gaze distance.

10. The travel control device according to claim 1, wherein the control command computation unit informs, when performing control on the basis of the steering assist amount and the acceleration command value, performing of the control on a display unit included in the vehicle.

* * * * *